(12) United States Patent
Endo (10) Patent No.: US 12,146,541 B2
(45) Date of Patent: Nov. 19, 2024

(54) COUPLING DEVICE

(71) Applicant: NIHON PLAST CO., LTD., Fujinomiya (JP)

(72) Inventor: Shinya Endo, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 366 days.

(21) Appl. No.: 17/558,659

(22) Filed: Dec. 22, 2021

(65) Prior Publication Data

US 2022/0307559 A1    Sep. 29, 2022

(30) Foreign Application Priority Data

Mar. 29, 2021    (JP) ................. 2021-055035

(51) Int. Cl.
*F16D 7/02*    (2006.01)

(52) U.S. Cl.
CPC .............. *F16D 7/024* (2013.01); *F16D 7/028* (2013.01)

(58) Field of Classification Search
CPC ................................ F16D 7/024; F16D 7/028
USPC .......................................................... 464/44
See application file for complete search history.

(56) References Cited

U.S. PATENT DOCUMENTS

| | | | |
|---|---|---|---|
| 1,198,421 A * | 9/1916 | Conklin | F16D 7/028 464/44 |
| 2,308,966 A * | 1/1943 | Saurer | F16F 7/02 |
| 2,564,605 A * | 8/1951 | Martin | F16D 9/06 464/43 |
| 11,214,198 B2 * | 1/2022 | Harris | F16D 7/024 |

FOREIGN PATENT DOCUMENTS

| | | |
|---|---|---|
| EP | 3134229 | 10/2018 |
| JP | 2000-087995 | 3/2000 |
| JP | 2005-131821 | 5/2005 |
| JP | 2008-169911 | 7/2008 |
| WO | WO 2006/100353 A1 * | 9/2006 |

OTHER PUBLICATIONS

German Office Action for German Patent Application No. 102022100453.8 dated Dec. 7, 2022.

\* cited by examiner

*Primary Examiner* — Greg Binda
(74) *Attorney, Agent, or Firm* — Amin, Turocy & Watson, LLP (57) ABSTRACT

A coupling device includes a first rotating body and a second rotating body disposed coaxially with each other and rotatable relative to each other. The coupling device includes a spacer disposed between the first rotating body and the second rotating body; and a pressing member for performing pressing of at least one rotating body of the first rotating body and the second rotating body against the spacer. The spacer is formed of an elastic member, and generates a frictional force between the spacer and the one rotating body when the pressing member performs the pressing. The one rotating body and the spacer are formed to have a configuration that allows the one rotating body or the spacer to be idled when torque larger than the frictional force acts between the one rotating body and the spacer.

5 Claims, 10 Drawing Sheets

COUPLING DEVICE

CROSS REFERENCE TO RELATED APPLICATIONS

Japanese Patent Application No. 2021-055035 filed on Mar. 29, 2021, including description, claims, drawings, and abstract the entire disclosure is incorporated herein by reference in its entirety.

TECHNICAL FIELD

The present invention relates to a coupling device including a first rotating body and a second rotating body disposed coaxially with each other and rotatable relative to each other.

BACKGROUND ART

A coupling device including two rotating bodies is known for coupling two different parts or members with each other. For example, as an example of the coupling device including two rotating bodies, a power transmission device is known in which two rotating bodies are each formed by a gear, and power (rotational force) is transmitted from one gear to the other gear. As an example of such a power transmission device, Patent Literature (hereinafter, referred to as PTL) 1 describes a clutch that transmits the torque of a first gear to a second gear. The clutch of PTL 1 is formed to block torque transmission from the second gear to the first gear.

CITATION LIST

Patent Literature

PTL 1
Japanese Patent Application Laid-Open No. 2008-169911

SUMMARY OF INVENTION

Technical Problem

The power transmission device of PTL 1 is formed in a complicated structure in order to transmit the rotational force from the first gear to the second gear and also to block the power from the second gear to the first gear as described above.

In a power transmission device in which power is transmitted between the first gear and the second gear, the following power control may be required depending on the usage mode of the device. For example, even during a state in which the rotational force is not transmitted between the first gear and the second gear, power control for generating torque (operating torque) for rotating the first gear or the second gear may be required. In addition, for example, power control for blocking the transmission of power when the torque acting between the first gear and the second gear exceeds a predetermined range may be required.

The present invention has been made in view of the above conventional problems. An object of the present invention is to provide a coupling device provided with two rotating bodies including a power transmission device. The coupling device is capable of achieving, with a relatively simple structure, at least one of power control to generate operating torque of a rotating body even during the state in which power transmission is blocked, and power control to block power transmission depending on the magnitude of the acting torque.

Solution to Problem

For achieving the above object, a coupling device provided by the present invention includes a first rotating body and a second rotating body disposed coaxially with each other and rotatable relative to each other. The coupling device includes a spacer disposed between the first rotating body and the second rotating body, and a pressing member for performing pressing of at least one rotating body of the first rotating body and the second rotating body against the spacer. The spacer is formed of an elastic member, and generates a frictional force between the spacer and the one rotating body when the pressing member performs the pressing. The one rotating body and the spacer are formed to have a configuration that allows the one rotating body to be idled with respect to the spacer or the spacer to be idled with respect to the one rotating body when torque larger than the frictional force acts between the one rotating body and the spacer.

In the coupling device according to the present invention, the first rotating body is preferably formed of a first gear provided with a plurality of teeth at the outer peripheral edge portion of the first gear, and the second rotating body is preferably formed of a second gear provided with a plurality of teeth at the outer peripheral edge portion of the second gear.

In addition, the present invention preferably has the following features: the spacer has an annular shape; a concave portion or a convex portion is provided at a contact portion of the spacer, in which the one rotating body comes into contact with the contact portion of the spacer, and the concave portion or the convex portion of the spacer has a shape of a circumference or an arc; and a convex portion or concave portion corresponding to the concave portion or the convex portion of the spacer is provided at a contact portion of the one rotating body, in which the spacer comes into contact with the contact portion of the one rotating body, the convex portion or the concave portion of the one rotating body has a shape of a circumference or an arc.

Further, the spacer is preferably provided so as not to be rotatable with respect to the other rotating body of the first rotating body and the second rotating body. It is also preferable that power is transmittable between the first rotating body and the second rotating body.

Advantageous Effects of Invention

The coupling device of the present invention is capable of achieving, with a relatively simple structure, at least one of power control to generate operating torque of a rotating body even during the state in which power transmission is blocked, and power control to block power transmission depending on the magnitude of the acting torque.

DESCRIPTION OF EMBODIMENTS

Hereinafter, preferred embodiments of the present invention with examples will be described with reference to the drawings. The present invention is not limited to the examples described below, and various modifications can be made as long as the modifications have substantially the same configuration as and similar effects to the present invention. For example, the following describes some application examples to which the coupling device of the present invention is applied, but the coupling device of the present invention can also be applied to various other products.

EXAMPLES

Figure 1:
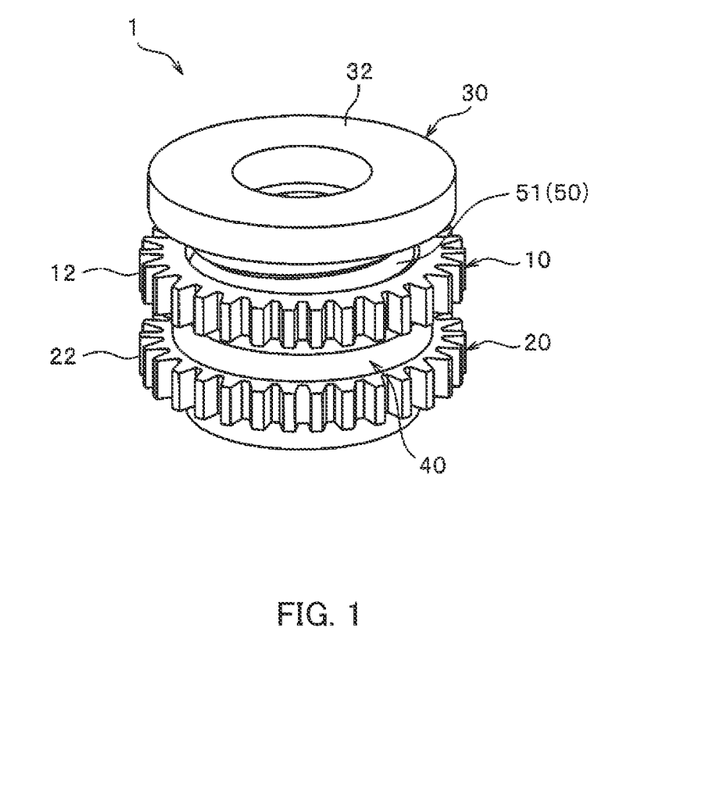
FIG. 1 is a perspective view schematically illustrating a coupling device according to an example of the present invention.
Figure 2:
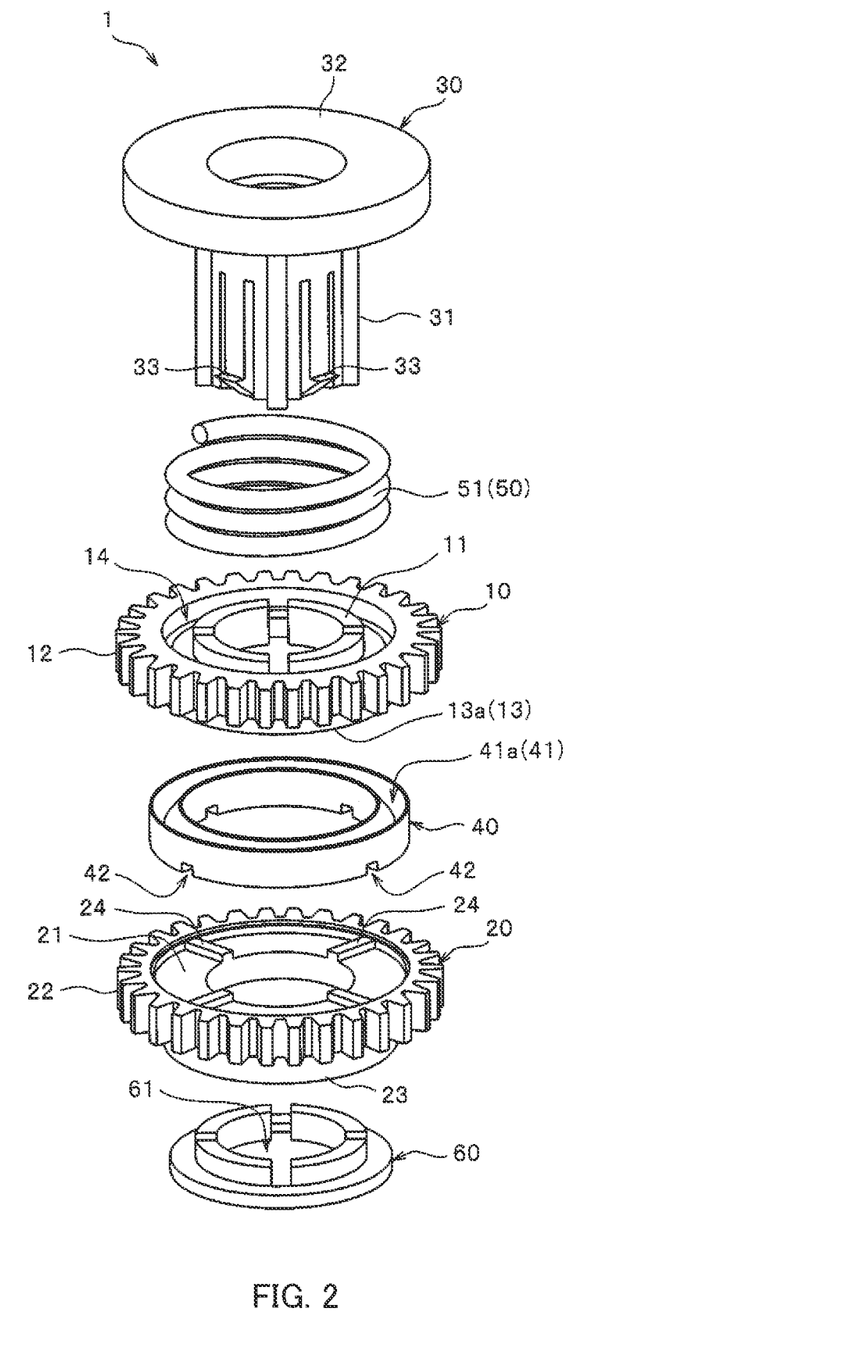
FIG. 2 is a perspective view schematically illustrating a state in which the coupling device illustrated in FIG. 1 is disassembled.
Figure 3:
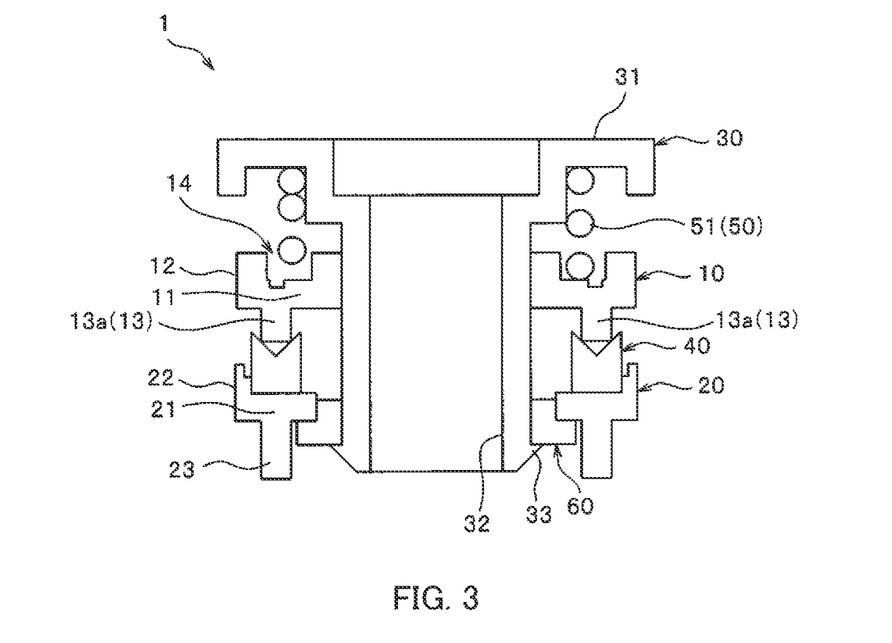
FIG. 3 is a cross-sectional view schematically illustrating a cross section when the coupling device illustrated in FIG. 1 is cut along the radial direction.

FIG. 1 is a perspective view schematically illustrating a coupling device according to the present example. FIG. 2 is a perspective view schematically illustrating a state in which the coupling device illustrated in FIG. 1 is disassembled. FIG. 3 is a cross-sectional view schematically illustrating a cross section when the coupling device illustrated in FIG. 1 is cut along the radial direction. In the following description, the direction along the rotation axes of the two rotating bodies is defined as the vertical direction. In this case, for convenience, the direction toward the side where a pressing member is disposed with respect to the rotating body is defined as upward, and the direction toward the opposite side is defined as downward.

The coupling device 1 of the present example includes support portion 30, first gear (first rotating body) 10 on the upper side and second gear (second rotating body) 20 on the lower side, which are rotatably supported by support portion 30, spacer 40 disposed between first gear 10 and second gear 20, pressing member 50 disposed on first gear 10, and fastening portion 60 engaging with the lower end portion of support portion 30. Each member/part is formed independently (formed separately from other members/parts).

Coupling device 1 is formed as a power transmission device (clutch mechanism) in which power (rotational force) is transmitted between first gear 10 and second gear 20. In other words, when power (rotational force) is input to first gear 10, it is possible to output power from second gear 20, and it is also possible to input and output power in the opposite direction.

Support portion 30 includes shaft portion 31 extending in the vertical direction and flange portion 32 integrally provided with the upper end portion of shaft portion 31. First gear 10, second gear 20, and spacer 40 are rotatably attached to shaft portion 31 of support portion 30, and pressing member 50 is attached to shaft portion 31 in an elastically deformable manner.

A plurality of engaging claw portions 33 for engaging and fixing the fastening portion 60 are provided at the lower end portion of shaft portion 31. Fastening portion 60 has an annular (ring-shaped) shape with insertion hole portion 61—for inserting shaft portion 31 therethrough—provided in the central portion of fastening portion 60. In the present example, the method and means for engaging or fixing fastening portion 60 to shaft portion 31 of support portion 30 are not particularly limited, and any conventionally known method or mean can be employed.

Pressing member 50, first gear 10, spacer 40, and second gear 20 are stacked in this order in the vertical direction, and held between flange portion 32 of support portion 30 and fastening portion 60 fixed to the lower end portion of shaft portion 31. In this case, second gear 20 is rotatably contacts fastening portion 60.

First gear 10 includes annular first base portion 11 provided with an insertion hole in the central portion thereof, first tooth portion 12 integrally provided with the outer peripheral portion of first base portion 11, and convex portion 13 protruding downward from first base portion 11 (see FIGS. 2 and 3). In the upper surface of first base portion 11, housing groove portion 14 where a part of pressing member 50 is placed and housed is provided along the circumferential direction of first gear 10.

First tooth portion 12 is provided with a plurality of teeth protruding outward in the radial direction of first gear 10. Convex portion 13 of first gear 10 is formed of ridge portion 13a protruding downward from the lower surface of first base portion 11. In first gear 10, ridge portion 13a is formed as a contact portion with which spacer 40 comes into contact, and ridge portion 13a is provided in a circumferential shape that continues over the entire circumferential direction of first gear 10 when viewed from the bottom surface (not illustrated) of first gear 10. In the present invention, the form of convex portion 13 provided in first gear 10 is not limited to that of ridge portion 13a, and other shapes and structures can be employed.

Second gear 20 includes annular second base portion 21 provided with an insertion hole in the central portion thereof, second tooth portion 22 integrally provided with the outer peripheral portion of second base portion 21, cylinder portion 23 protruding downward from second base portion 21 in a cylindrical shape, and four ribs 24 protruding from the upper surface of second base portion 21 (see FIGS. 2 and 3). Second tooth portion 22 is provided with a plurality of teeth protruding outward in the radial direction of second gear 20. Four ribs 24 of second gear 20 are linearly provided along the radial direction of second gear 20 and are disposed at equal intervals in the circumferential direction of second gear 20.

Spacer 40 of the present example is formed of a material and/or in a shape for generating a frictional force between first gear 10 and spacer 40 such that first gear 10 and spacer 40 can rotate integrally (or together with each other) when a rotational force is input to first gear 10 or second gear 20 during a state in which first gear 10 is pressed against spacer 40 by pressing member 50.

More specifically, spacer 40 is formed of an elastic member. The elastic member is a member having elasticity. Examples of the elastic member include members formed of an elastically deformable material and members having a shape for exhibiting elasticity. The elastic member may be formed of a soft synthetic resin.

Spacer 40 has an annular or ring shape. Concave portion 41 is provided in the circumferential upper surface portion of spacer 40. Concave portion 41 of spacer 40 is formed of concave groove portion 41a where above-described ridge portion 13a of first gear 10 is housed and comes into contact. In the present invention, the form of concave portion 41 provided in spacer 40 is not limited to that of concave groove portion 41a, and other shapes and structures can be employed.

Concave groove portion 41a is provided in a circumferential shape that continues over the entire circumferential direction of spacer 40 in a plan view (not illustrated) of spacer 40. Housing ridge portion 13a of first gear 10 in concave groove portion 41a of spacer 40 and contacting ridge portion 13a with concave groove portion 41a allows for prevention of the relative position between first gear 10 and spacer 40 from shifting. Further, an appropriate frictional force can be stably generated between first gear 10 and spacer 40.

The lower end portion of spacer 40 is provided with four engaging convex portions 42 into which ribs 24 provided on second gear 20 are inserted and engaged. When spacer 40 is superposed on second gear 20, spacer 40 is placed so as not to be rotatable with respect to second gear 20 by engaging ribs 24 of second gear 20 with corresponding engaging convex portions 42 of spacer 40.

Pressing member 50 of the present example is formed of coil spring 51. Coil spring 51 biases first gear 10, thereby pressing first gear 10 against spacer 40. This configuration can stably maintains a state in which ridge portion 13a of first gear 10 is housed in and in contact with concave groove portion 41a of spacer 40. In addition, coil spring 51 can press spacer 40 against second gear 20 (in other words, second gear 20 can be pressed against spacer 40), thereby stably maintaining a state in which ribs 24 of second gear 20 are engaged with engaging convex portions 42 of spacer 40.

Pressing member 50 is formed of coil spring 51 in the present example, but pressing member 50 may be formed of an elastic member other than coil spring 51 as long as pressing member 50 can press first gear 10 against spacer 40. Pressing member 50 of the present example is disposed on the upper side of first gear 10 (the side opposite to the spacer 40 side in first gear 10), but pressing member 50 may be disposed on the lower side of second gear 20 (the side opposite to the spacer 40 side in second gear 20), or may be disposed on both the upper side of first gear 10 and the lower side of second gear 20 in the present invention.

Coupling device (power transmission device) 1 of the present example is formed in a simple structure that can be assembled relatively easily. That is, coupling device 1 can be assembled easily by attaching coil spring 51, first gear 10, spacer 40, and second gear 20 to shaft portion 31 of support portion 30 in this order, and then inserting shaft portion 31 of support portion 30 through insertion hole portion 61 of fastening portion 60, and fixing fastening portion 60 to the lower end portion of shaft portion 31.

Coupling device 1 of the present example can smoothly perform the power transmission such that the rotational force input to first gear 10 is output from second gear 20, and also the power transmission in the opposite direction. According to coupling device 1 of the present example, for example, during a state in which one of first gear 10 and second gear 20 is maintained so as not to be rotatable, it becomes necessary to input torque larger than the frictional force generated between first gear 10 and spacer 40 to the other one of first gear 10 and second gear 20 for performing operation of rotating the other gear. As a result, torque (operating torque) can be easily and stably generated when the other gear is operated for rotation. It is thus possible to give an operator a feeling of operation or use of coupling device 1.

In coupling device 1 of the present example in this case, the magnitude of the operating torque can be easily changed and adjusted by, for example, changing the material of spacer 40, changing the shape of spacer 40, and changing the reaction force of pressing member 50 (elastic force of coil spring 51).

Further, coupling device 1 of the present example can perform the power control during a state in which a rotational force is input to one of first gear 10 and second gear 20 as follows: for example, when the torque acting between first gear 10 and second gear 20 becomes larger than the frictional force generated between first gear 10 and spacer 40, the integral rotation of first gear 10 and spacer 40 due to the frictional force cannot be maintained, and thus first gear 10 is idled (independently rotated) with respect to spacer 40 (or spacer 40 with respect to first gear 10).

Coupling device 1 of the present example performing the above power control can block power transmission between first gear 10 and spacer 40 when the torque acting between first gear 10 and second gear 20 exceeds the set value defined by the frictional force, thereby exhibiting a cancel function that cancels the input torque. In coupling device 1 of the present example in this case, the set value of the cancel function defined by the frictional force can be easily changed or adjusted by, for example, changing the material of spacer 40, changing the shape of spacer 40, and changing the reaction force of pressing member 50 (elastic force of coil spring 51).

In spacer 40 of the present example, circumferential concave groove portion 41a that continues over the entire circumferential direction of spacer 40 is formed in the upper surface portion of annular spacer 40 as illustrated in FIGS. 2 and 3. In addition, first gear 10 is provided with ridge portion 13a to be housed in and in contact with concave groove portion 41a of spacer 40. However, the spacer used for the coupling device (power transmission device) of the present invention is not limited to this configuration. For example, a convex portion (ridge portion) may be provided on the upper surface portion of the spacer, and a concave portion (concave groove portion) for housing and contacting the convex portion may be provided in the first gear.

Figure 4:
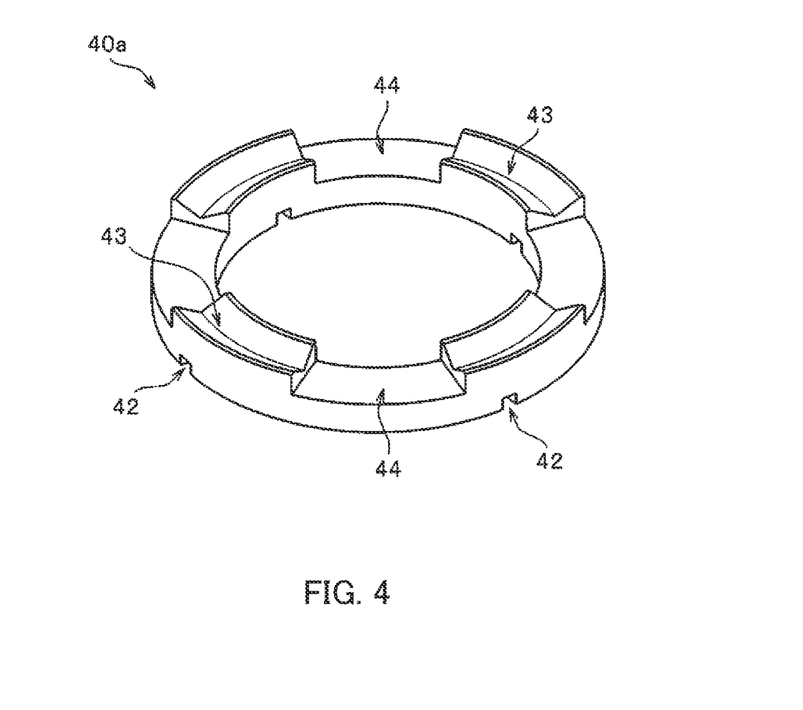
FIG. 4 is a perspective view schematically illustrating a modification of a spacer used in the coupling device.
Figure 5:
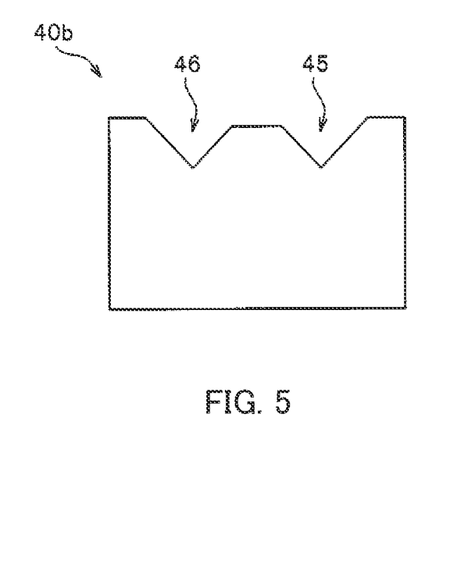
FIG. 5 is a perspective view schematically illustrating another modification of the spacer used in the coupling device.

In present invention, for example, spacers 40a and 40b illustrated in FIGS. 4 and 5 as modifications can be used to form a coupling device (power transmission device) in place of spacer 40 of the above-described example. For example, spacer 40a according to a modification as illustrated in FIG. 4 is formed in such a way that four concave groove portions 43 and four non-contact portions 44 are alternately provided in the circumferential direction of spacer 40a. Concave groove portions 43 are for housing and contacting ridge portion 13a of first gear 10, and non-contact portions 44 do not allow the contact of ridge portion 13a of first gear 10. Spacer 40b according to a modification as illustrated in FIG. 5 is formed in such a way that two circumferential concave groove portions 45 and 46 are provided in the radial direction on the upper surface portion of spacer 40b.

A coupling device formed by using spacer 40a illustrated in FIG. 4 or spacer 40b illustrated in FIG. 5 can also obtain the same effect as coupling device 1 of the above-described example. Further, in this case, the magnitude of the operating torque and the set value of the cancel function different from those of coupling device 1 of the example can be set.

Figure 6:
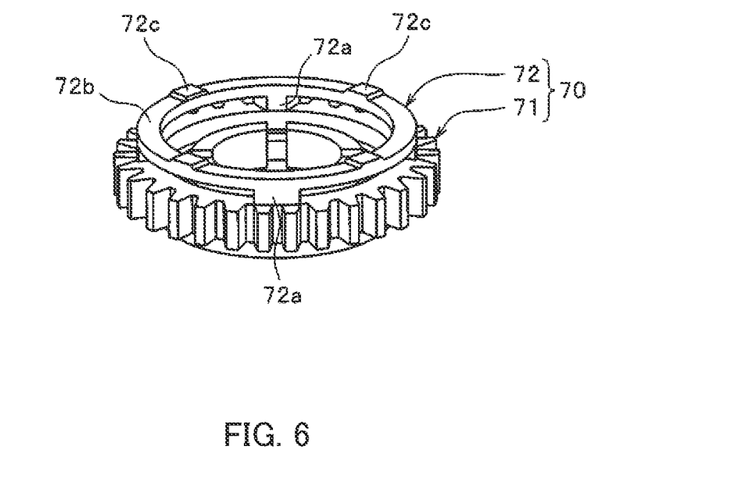
FIG. 6 is a perspective view schematically illustrating a modification of a first rotating body and the spacer used in the coupling device.

In coupling device 1 of the above-described example, second gear 20 and spacer 40 are separately formed. However, in present invention, a coupling device may be formed by using gear member 70 having a shape such that second gear 20 and spacer 40 are integrated as illustrated in FIG. 6. In this case, gear member 70 of FIG. 6 includes second gear portion 71 and spacer portion 72.

Second gear portion 71 of gear member 70 has substantially the same shape as second gear 20 of the example except that rib 24 is not provided in second gear portion 71. Spacer portion 72 includes four pillar portions 72a rising from second gear portion 71, ring portion 72b coupling upper end portions of pillar portions 72a, and four contact portions 72c which protrude from the upper surface of ring portion 72b and are to be in contact with first gear 10. Contact portion 72c is disposed at an intermediate position between two adjacent pillar portions 72a in the circumferential direction of ring portion 72b. Spacer portion 72 can be elastically deformed in such a way that ring portion 72b is bent when contact portion 72c is brought into contact with first gear 10.

A coupling device formed by using gear member 70 illustrated in FIG. 6 can also obtain the same effect as coupling device 1 of the above-described example. In this case, the magnitude of the operating torque and the set value of the cancel function different from those of coupling device 1 of the example can also be set.

Further, in present invention, first rotating ring 80 and second rotating ring 90 which are in an annular shape and have no tooth portion may be respectively provided in coupling device 2 as first rotating body and second rotating body in place of first gear 10 and second gear 20 of the above-described example, as described below with reference to FIG. 12. Coupling device 2 including such first rotating ring 80 and second rotating ring 90 can also easily and stably perform power control for generating the operating torque when operation of rotating one of first rotating ring 80 and second rotating ring 90 is performed. It is thus possible to give an operator a feeling of operation or use of coupling device 2.

Figure 7:
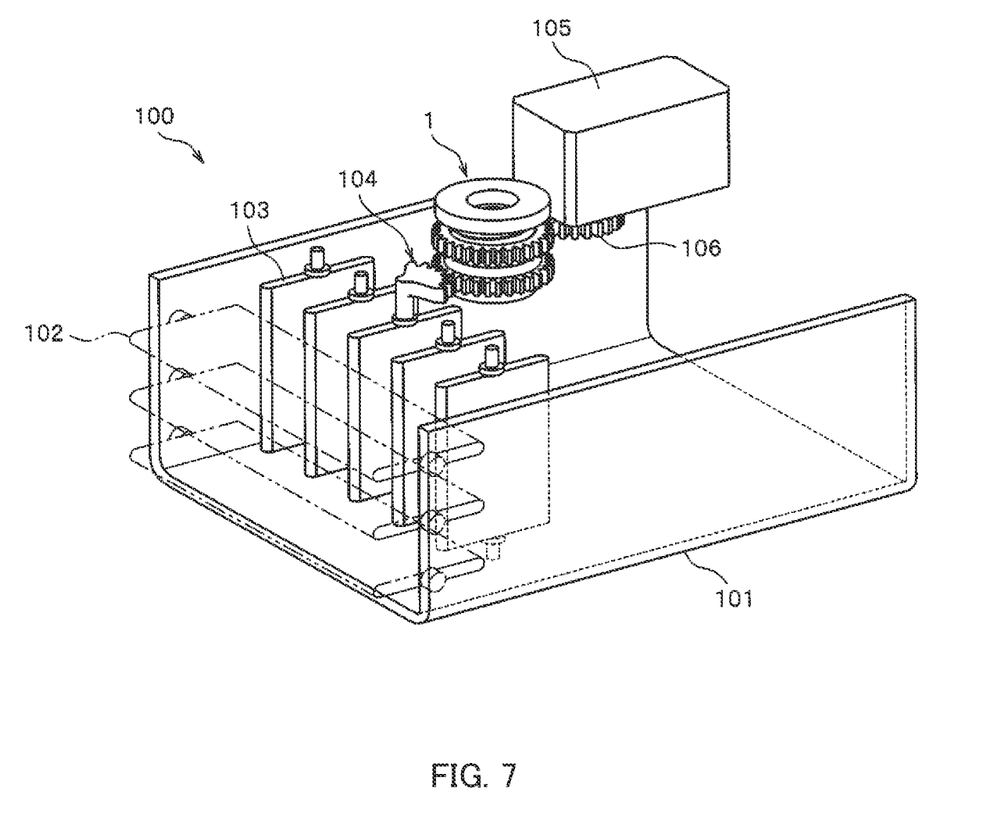
FIG. 7 is a perspective view schematically illustrating a part of a wind direction adjusting device with the coupling device illustrated in FIG. 1 applied thereto.
Figure 8:
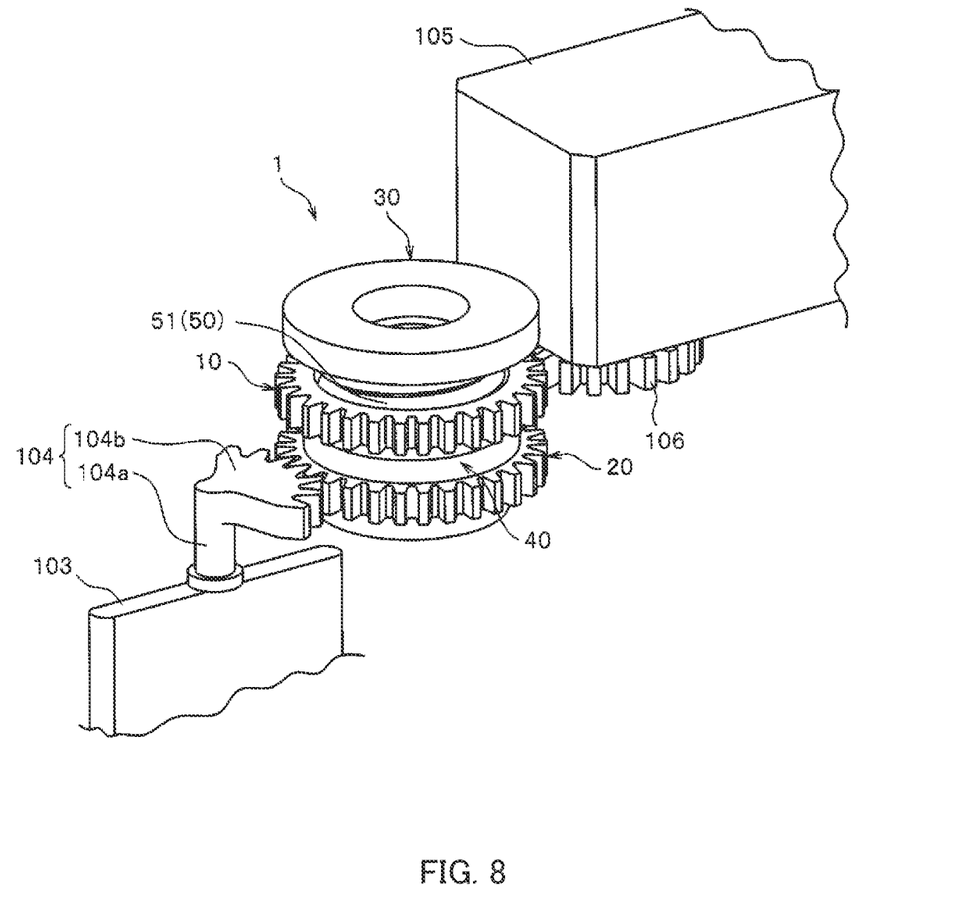
FIG. 8 is a perspective view schematically illustrating a main part of the wind direction adjusting device illustrated in FIG. 7.

The following describes a case where coupling device 1 is applied to wind direction adjusting device 100 (first application example) as a specific embodiment with reference to FIGS. 7 and 8. In this first application, coupling device (power transmission device) 1 of the above-described example is applied.

Wind direction adjusting device 100 illustrated in FIG. 7 includes case body 101 provided with a space for air to flow through the inside thereof, plurality of first fins 102 provided at the opening of case body 101 on the downstream side, and plurality of second fins 103 provided upstream of and adjacent to first fins 102. In this case, the upstream side and the downstream side respectively mean the upstream side and the downstream side in the air flow direction.

Plurality of first fins 102 are disposed along the width direction of case body 101 and are held by case body 101 so as to be turnable in the height direction of case body 101. In addition, plurality of first fins 102 are coupled to each other by first link member (not illustrated) so that the rotations of first fins 102 are linked with each other.

Plurality of second fins 103 are disposed along the height direction of case body 101 and are held by case body 101 so as to be turnable in the width direction of case body 101. In addition, plurality of second 103 are coupled to each other by second link member (not illustrated) so that the rotations of second fins 103 are linked with each other.

Connecting member 104 is coupled to one of second fins 103. Connecting member 104 includes connecting shaft portion 104a connected to second fin 103, and fan-shaped gear 104b integrally formed with the upper end portion of connecting shaft portion 104a. Fan-shaped gear 104b of connecting member 104 meshes with second gear 20 of coupling device 1 of the example, and the transmission of a rotational force from second gear 20 to fan-shaped gear 104b turns plurality of second fins 103 in a linked manner.

Wind direction adjusting device 100 is provided with drive unit 105 including a built-in motor (not illustrated), external gear 106 attached to the rotating shaft of drive unit 105, and coupling device 1 of the example connected to external gear 106. External gear 106 meshes with first gear 10 of coupling device 1, and the driving force (rotational force) of drive unit 105 is input to first gear 10 of coupling device 1 via external gear 106. When drive unit 105 is stopped, first gear 10 is also held in a stopped state, not rotating.

For turning second fins 103 by the driving force of drive unit 105 in such wind direction adjusting device 100, first gear 10 of coupling device 1 is rotated by the driving force of drive unit 105 input to first gear 10, and spacer 40 and second gear 20 can be integrally rotated with first gear 10 by the frictional force generated between first gear 10 and spacer 40 in coupling device 1. As a result, the rotational force of second gear 20 is transmitted to fan-shaped gear 104b of connecting member 104, and thus plurality of second fins 103 can be turned in a linked manner in the width direction (left and right) by the drive of drive unit 105.

On the other hand, during a state in which drive unit 105 is stopped (a state in which first gear 10 does not rotate) in wind direction adjusting device 100, plurality of second fins 103 can be rotated in a linked manner in the width direction by manually operating an operation unit (not illustrated) connected to second fin(s) 103. More specifically, for manually operating second fins 103, although first gear 10 is held in a non-rotating state as described above, a rotational force (operating torque) is input to second gear 20 of coupling device 1 via connecting member 104 by the manual operation. At this time, second gear 20 and spacer 40 can be idled with respect to first gear 10 because the operating torque input to second gear 20 becomes larger than the frictional force generated between first gear 10 and spacer 40. This configuration easily allows manual turning of second fins 103 despite the stopped state of drive unit 105.

In addition, when second fins 103 are manually turned during the stopped state of drive unit 105, the change in frictional force from static frictional force to dynamic frictional force of spacer 40 with respect to first gear 10 can become relatively small because spacer 40 is formed of an elastic member. As a result, an operator hardly feels uncomfortable when starting the manual turning operation of second fins 103. In addition, for manually turning second fins 103, operating torque larger than the frictional force is required, and thus it is possible to appropriately give the operator a feeling of operation of second fins 103. Further, when the turning of second fins 103 is stopped in a desired direction (angle), the stopped state of second fins 103 (i.e., direction of second fins 103) can be stably held by the frictional force between first gear 10 and spacer 40.

Figure 9:
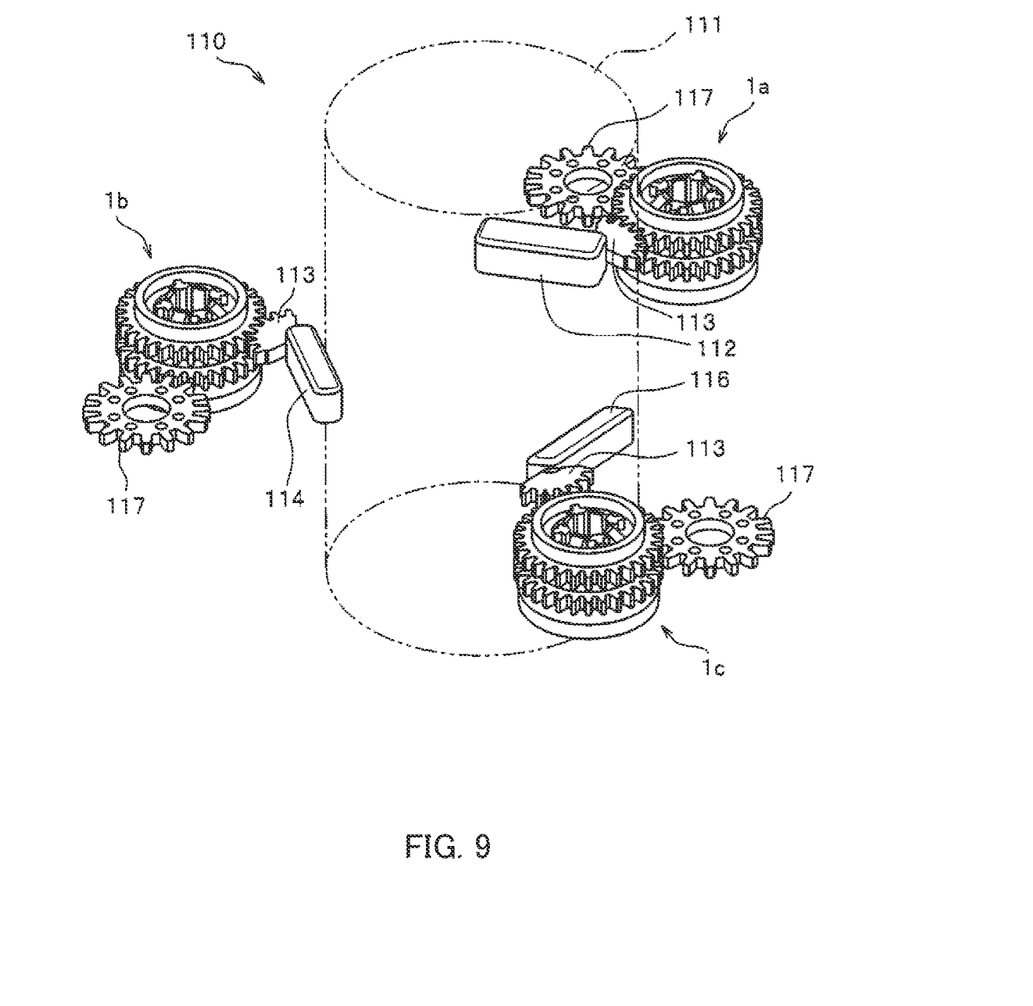
FIG. 9 is a perspective view schematically illustrating a part of a cup holder device with the coupling device illustrated in FIG. 1 applied thereto.
Figure 10:
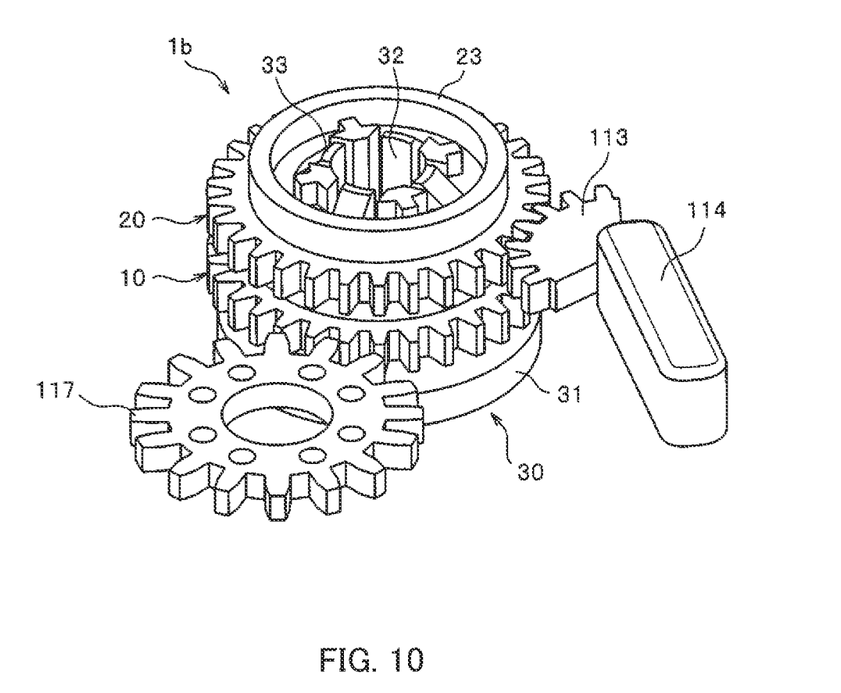
FIG. 10 is a perspective view schematically illustrating a main part of the cup holder device illustrated in FIG. 9.

The following describes a case where coupling device (power transmission device) 1 of the example is applied to cup holder device 110 (second application example) with reference to FIGS. 9 and 10.

Cup holder device 110 illustrated in FIG. 9 includes holder main body 111 where a container such as a cup (not illustrated) is inserted and held, upper first tab 112, middle second tab 114, and lower third tab 116, which are for holding the container inserted in holder main body 111 from the side. Fan-shaped gears 113 are integrally provided on first tab 112 to third tab 116, respectively.

In cup holder device 110, first tab 112 to third tab 116 individually turn on a plane orthogonal to the height direction of holder main body 111, allowing the following operations: holding the container (not illustrated) inserted in holder main body 111 by pressing the container from its side surface side; and releasing the holding state of the container brought by first tab 112 to third tab 116.

For each of first tab 112 to third tab 116, a drive unit (not illustrated), external gear 117 attached to the rotating shaft of the drive unit, and coupling device 1 of the example connected to external gear 117 are provided in cup holder device 110. In this case, for convenience, coupling devices 1 provided for first tab 112, second tab 114, and third tab 116 are referred to as first coupling device 1a, second coupling device 1b, and third coupling device 1c, respectively. Further, each of first coupling device 1a, second coupling device 1b, third coupling device 1c is installed at cup holder device 110 with its vertical direction reversed.

In cup holder device 110, fan-shaped gears 113 of first tab 112 to third tab 116 mesh with second gears 20 of first coupling device 1a to third coupling device 1c, respectively. First gears 10 of first coupling device 1a to third coupling device 1c mesh with external gears 117, respectively. Driving forces (rotational forces) of drive units (not illustrated) are input to first gears 10 of first coupling device 1a to third coupling device 1c via external gears 117, respectively. When each drive unit is stopped, corresponding first gear 10 is also held in a stopped state, not rotating.

In above-described cup holder device 110, driving individual drive units while the container is inserted in holder body 111 can turn first tab 112 to third tab 116 in the directions toward the container or the directions away from the container via first coupling device 1a to third coupling device 1c. Therefore, turning first tab 112 to the third tab 116 in the direction toward the container while the container is inserted in holder main body 111 can automatically and stably hold the container in holder main body 111 with the use of first tab 112 to third tab 116 in such a way that the container does not move (or barely moves).

In addition, for example, when rotational forces in the directions toward the container are input from the drive units to respective first tab 112 to third tab 116 via first coupling device 1a to third coupling device 1c while first tab 112 to third tab 116 are in contact with the container, the above-described cancel functions of first coupling device 1a to third coupling device 1c can block the transmission of power between first gears 10 and spacers 40. As a result, it is possible to prevent a large load from being applied to each of first coupling device 1a to third coupling device 1c, thereby preventing damage and the like to first coupling device 1a to third coupling device 1c.

Further, for example, when the driving of drive units is stopped while first tab 112 to third tab 116 hold the container, the respective positions of first tab 112 to third tab 116 can be stably held by the frictional forces between first gears 10 and spacers 40 in first coupling device 1a to third coupling device 1c. As a result, the state in which the container is held by first tab 112 to third tab 116 can be stably maintained.

On the other hand, the state in which the container is held can be automatically released by turning first tab 112 to third tab 116 in the directions away from the container by driving the corresponding drive units while first tab 112 to third tab 116 hold the container in holder main body 111. As a result, the container can be easily taken out from holder main body 111.

In cup holder device 110, during a state in which drive unit are stopped, second gear 20 and spacer 40 can be idled with respect to first gear 10 by manually operating each of first tab 112 to third tab 116. First tab 112 to the third tab 116 can be thus easily turned. In particular, in this case, operating torque larger than the frictional force between first gear 10 and corresponding spacer 40 is required for manually turning each of first tab 112 to third tab 116. It is thus possible to appropriately give an operator a feeling of operation.

Figure 11:
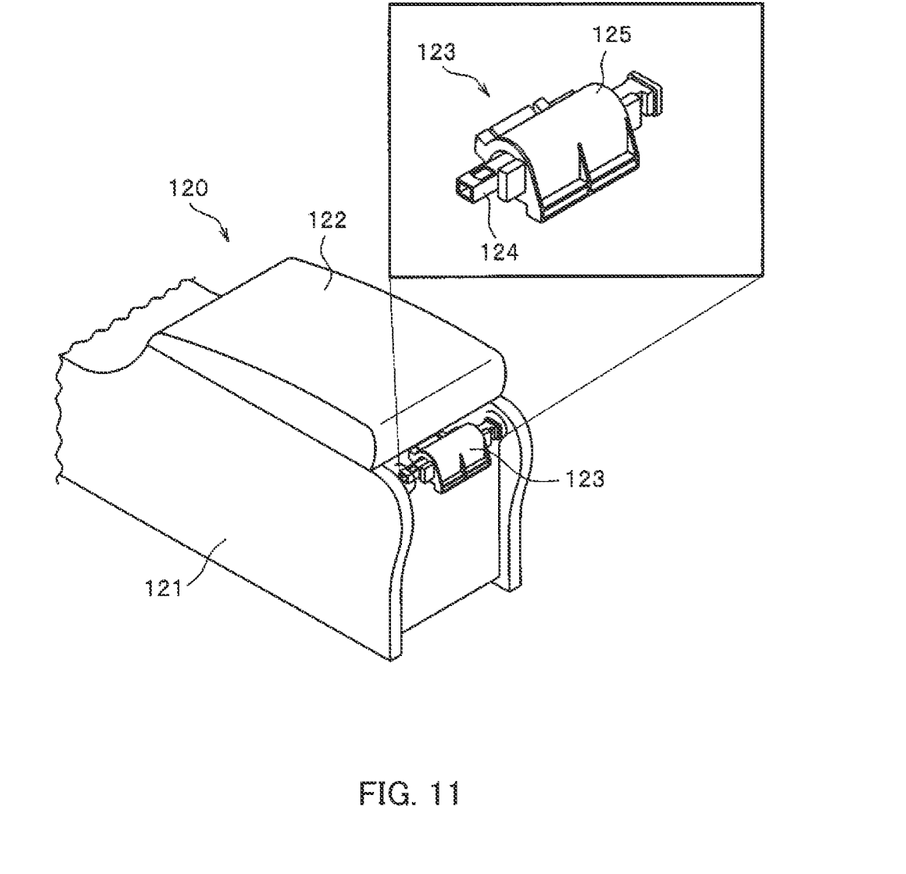
FIG. 11 is a perspective view and a partially enlarged view illustrating a console box with a coupling device according to a modification of the present invention is applied thereto.
Figure 12:
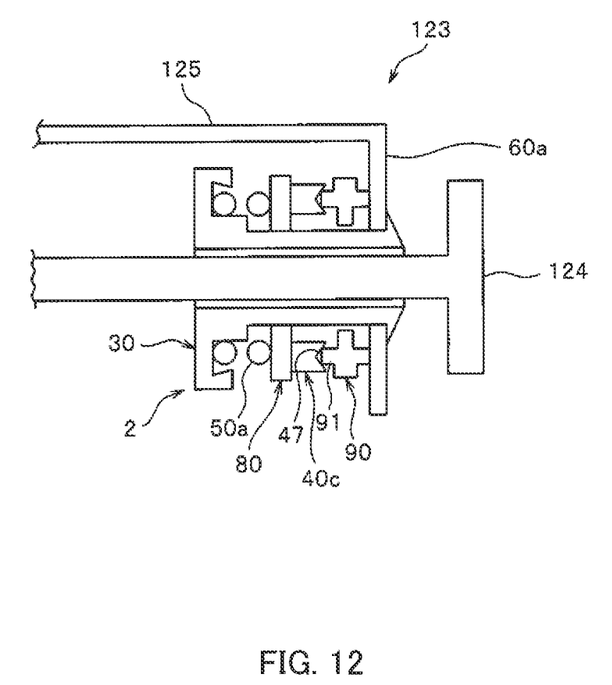
FIG. 12 is a cross-sectional view schematically illustrating a hinge portion of the console box illustrated in FIG. 11.

The following describes a case where coupling device 2 according to a modification is applied to console box 120 (third application example) in place of first gear 10 and second gear 20 in coupling device 1 of the example, with reference to FIGS. 11 and 12. Coupling device 2 according to this modification is provided with first rotating ring 80 and second rotating ring 90 which are in an annular shape and have no tooth portion.

Console box 120 illustrated in FIG. 11 includes console main body portion 121 that includes a housing portion, lid portion (armrest) 122 disposed on console main body portion 121 in such a way that lid portion 122 can be opened and closed, and hinge portion 123 that connects console main body portion 121 and lid portion 122. Hinge portion 123 includes shaft portion 124 fixed to console main body portion 121, coupling device 2 of the modification fixed to shaft portion 124, and cover portion 125 covering coupling device 2. Cover portion 125 is fixed to lid portion 122 and is formed so as to turn together with lid portion 122.

Coupling device 2 of the modification includes support portion 30, first rotating ring 80 and second rotating ring 90 which are rotatably supported by support portion 30, spacer 40c disposed between first rotating ring 80 and second rotating ring 90, pressing member (coil spring) 50a, and fastening portion 60a that engages with a tip portion of support portion 30. In console box 120, coupling device 1 of the example including first gear 10 and second gear 20 may be used in place of coupling device 2 including first rotating ring 80 and second rotating ring 90.

First rotating ring 80 may be held by a holding portion (not illustrated) so as not to rotate in coupling device 2. Second rotating ring 90 is fixed to fastening portion 60a, and fastening portion 60a is integrally formed with cover portion 125. When coupling device 1 of the example is used in place of coupling device 2, cover portion 125 may be connected to second gear 20 of coupling device 1 via a gear (not illustrated) provided at cover portion 125.

Spacer 40c of coupling device 2 is provided so as not to be rotatable with respect to first rotating ring 80. In spacer 40c, circumferential concave groove 47 is provided at a contact portion that comes into contact with second rotating ring 90. Second rotating ring 90 is provided with circumferential ridge portion 91 housed in and in contact with concave groove portion 47 of spacer 40c.

In coupling device 2 of the modification, pressing member 50a presses second rotating ring 90 against spacer 40c, thereby stably maintaining a state in which ridge portion 91 of second rotating ring 90 is housed in and in contact with concave groove portion 47 of spacer 40*c*. In addition, a frictional force is generated between second rotating ring 90 and spacer 40*c*. In coupling device 2 of the modification, when the torque acting on second rotating ring 90 becomes larger than the frictional force, second rotating ring 90 can be idled with respect to spacer 40*c*.

According to above-described console box 120, when lid portion 122 is opened or closed, second rotating ring 90 can be idled with respect to spacer 40*c*, and thus lid portion 122 can be easily opened and closed. In addition, when an opening/closing operation of lid portion 122 is performed in this way, operating torque larger than the frictional force is required, and thus it is possible to appropriately give an operator a feeling of operation. Further, when the opening/closing operation of lid portion 122 is stopped, lid portion 122 can be held at the stopped position by the frictional force between second rotating ring 90 and spacer 40*c*.

REFERENCE SIGNS LIST

1 Coupling device (power transmission device)
1*a* Coupling device (first coupling device)
1*b* Coupling device (second coupling device)
1*c* Coupling device (third coupling device)
2 Coupling device
10 First gear (first rotating body)
11 First base portion
12 First tooth portion
13 Convex portion
13*a* Ridge portion
14 Housing groove portion
20 Second gear (second rotating body)
21 Second base portion
22 Second tooth portion
23 Cylinder portion
24 Rib
30 Support portion
31 Shaft portion
32 Flange portion
33 Engaging claw portion
40, 40*a* Spacer
40*b*, 40*c* Spacer
41 Concave portion
41*a* Concave groove portion
42 Engaging convex portion
43 Concave groove portion
44 Non-contact portion
45, 46 Concave groove portion
47 Concave groove portion
50, 50*a* Pressing member
51 Coil spring
60, 60*a* Fastening portion
61 Insertion hole portion
70 Gear member
71 Second gear portion
72 Spacer portion
72*a* Pillar portion
72*b* Ring portion
72*c* Contact portion
80 First rotating ring
90 Second rotating ring
91 Ridge portion
100 Wind direction adjusting device
101 Case body
102 First fin
103 Second fin
104 Connecting member
104*a* Connecting shaft portion
104*b* Fan-shaped gear
105 Drive unit
106 External gear
110 Cup holder device
111 Holder main body
112 First tab
113 Fan-shaped gear
114 Second tab
116 Third tab
117 External gear
120 Console box
121 Console main body portion
122 Lid portion (armrest)
123 Hinge portion
124 Shaft portion
125 Cover portion

What is claimed is:

1. A coupling device including a first rotating body and a second rotating body disposed coaxially with each other and rotatable relative to each other, the coupling device comprising:
a spacer disposed between the first rotating body and the second rotating body; and
a pressing member for performing pressing of at least one rotating body of the first rotating body and the second rotating body against the spacer, wherein
the spacer includes an elastic member, and generates a frictional force between the spacer and the one rotating body when the pressing member performs the pressing,
the one rotating body and the spacer are formed to have a configuration that allows the one rotating body to be idled with respect to the spacer or the spacer to be idled with respect to the one rotating body when torque larger than the frictional force acts between the one rotating body and the spacer, and
a plurality of contact portions with which the one rotating body comes into contact and a plurality of portions with which the one rotating body does not come into contact are alternately provided on the spacer in a circumferential direction of the spacer.

2. The coupling device according to claim 1, wherein:
the first rotating body includes a first gear provided with a plurality of teeth at an outer peripheral edge portion of the first gear; and
the second rotating body includes a second gear provided with a plurality of teeth at an outer peripheral edge portion of the second gear.

3. The coupling device according to claim 1, wherein:
the spacer has an annular shape;
a concave portion or a convex portion is provided in the plurality of contact portions of the spacer, the concave portion of the spacer having a shape of an arc, the convex portion of the spacer having a shape of an arc; and
a convex portion or a concave portion corresponding to the concave portion or the convex portion of the spacer is provided in a contact portion of the one rotating body, the contact portion of the one rotating body being a portion with which the spacer comes into contact, the convex portion of the one rotating body having a shape of a circumference or an arc, the concave portion of the one rotating body having a shape of a circumference or an arc.

4. The coupling device according to claim 1, wherein the spacer is provided so as not to be rotatable with respect to the other rotating body of the first rotating body and the second rotating body.

5. The coupling device according to claim 1, wherein power is transmittable between the first rotating body and the second rotating body.

* * * * *